United States Patent Office 2,832,565
Patented Apr. 29, 1958

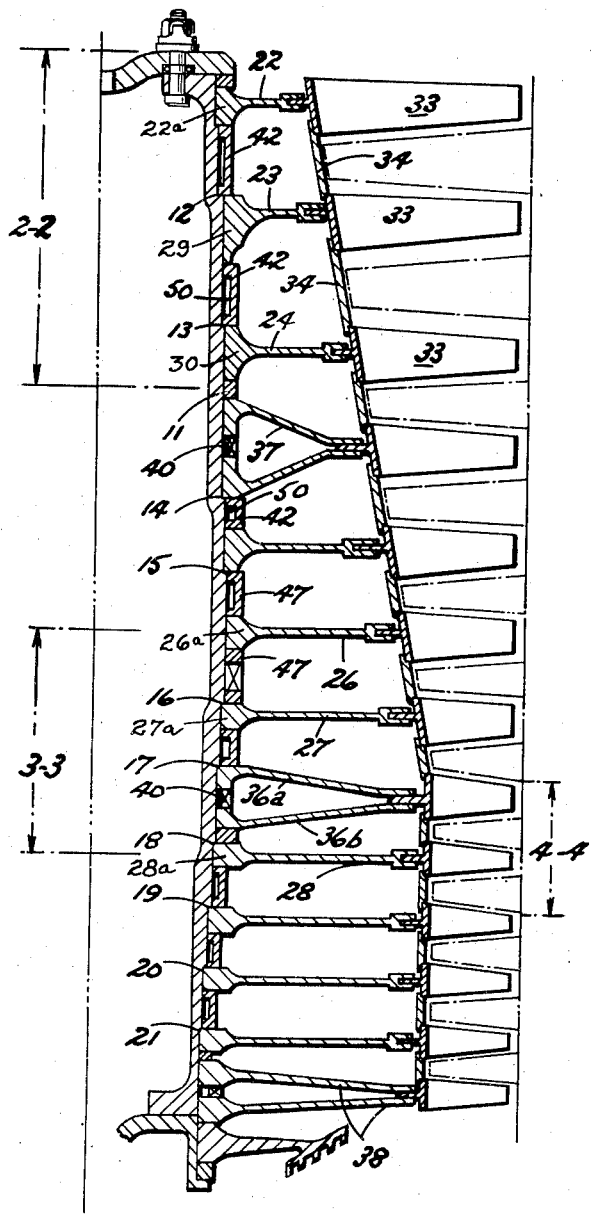

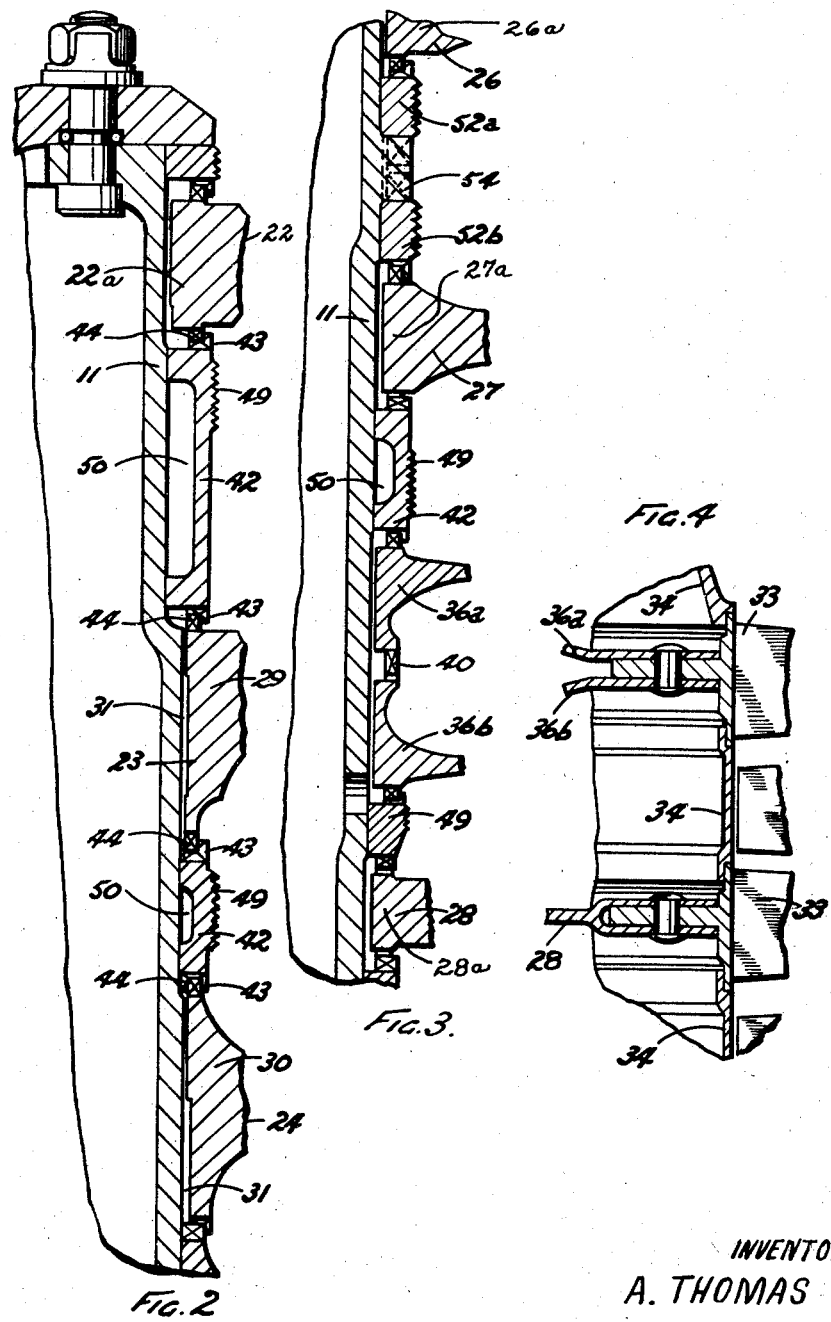

2,832,565

BLADE CARRYING ROTORS

Albert Thomas and Horace S. Rainbow, Coventry, England, assignors to Armstrong Siddeley Motors Limited, Coventry, England Application March 3, 1952, Serial No. 274,609

Claims priority, application Great Britain March 30, 1951

3 Claims. (Cl. 253—39)

This invention relates to a driving support from a shaft of a number of blade-carrying discs—for example, a built-up, multi-stage, axial-flow, compressor rotor for a gas turbine engine, although the invention is not limited in this respect.

In a known type of built-up, multi-stage rotor, including a shaft which drivingly supports a number of blade-carrying discs, the discs have been directly supported upon the shaft by their hubs having an interference fit with the shaft, the hubs being so designed as to be lightly stressed to resist centrifugal deformation in the plane of rotation in working conditions, whereby the fit between the shaft and hubs will be maintained in working conditions.

However, unless the interference fits are large or heavy ones and the discs are adequate to resist the centrifugal deformation, there is a tendency for the loosening of the discs on the shaft, with the consequent non-concentricity of the shaft and discs during running, and the obvious risk of serious damage occurring.

The main object of the present invention is to provide a disc-type rotor of robust yet light construction, in which the blade-carrying discs can be very highly stressed, particularly at the hubs, and yet remain adequately supported concentrically with the shaft. A further object is to provide a rotor construction the parts of which can be readily assembled and dismantled without damage—for example, for the replacement of blades.

According to the invention, the bores of the hubs of at least the majority of the blade-carrying discs are always radially clear of the supporting shaft, each of these hubs being supported by a ring of axially-extending teeth, at each axial end, respectively engaged with axially-extending teeth on spacing sleeves which are detachably fitted on the shaft, means being provided for transmitting the drive between the shaft and at least one of the sleeves. Such an arrangement allows centrifugal deformation in its plane of rotation whilst maintaining the essential concentricity of the disc and shaft. In other words, the discs are self-centering, the teeth being of any appropriate form which will allow centrifugal deformation of the discs whilst providing the desired self-centering characteristic.

Preferably the toothed sleeves are relatively thin radially so as not to be subject to material deformation under cenrifugal action. They may have a transitional fit, preferably a slight interference fit, on the shaft.

In the accompanying drawings:

Figure 1 is a diagrammatic sectional view of the right-hand half of the bladed rotor of an axial-flow compressor, the stationary coacting blades of the compressor being indicated by chain lines; and Figures 2, 3 and 4 are enlarged sectional views at the lines 2—2, 3—3 and 4—4, respectively, of Figure 1.

The drawings show a hollow rotor shaft 11, the external diameter thereof increasing at the steps 12, 13, 14, and 15 from one end towards a point near the centre, after which the external diameter is reduced at the steps 16, 17, 18, 19, 20 and 21. Such a shaft is adequately resistant to bending.

The drawings show a number of blade-carrying discs, such as those marked 22, 23, 24, which are relatively thin in axial dimension, except for their hubs 22a, 29, 30 respectively which latter have substantantial axial dimensions. Their hubs have clearance from the surface of the rotor shaft. Thus, the hubs 22a, 26a, 27a, 28a of the discs 22, 26, 27 and 28 respectively (see Figures 2 and 3) are shown exaggerated as having very definite radial clearances, whilst other of the hubs, namely, those marked 29 and 30 of discs 23 and 24 respectively in Figure 2, also have internal grooves 31. In practice, of course, the radial clearances are of a minor order.

For a large rotor, in order to provide the greatest strength with lightness, the shaft, discs and rotor blades 33, as well as the shroud rings 34 between the blades of adjacent pairs of rotor discs, are preferably of steel.

With a view to preventing flexing of the relatively thin discs in an axial direction due to reaction from the gaseous fluid pressure at the blades, certain of the blade rows may be carried by twin disc portions which are concave towards one another, as shown at 36a, 36b. Three such twin discs are illustrated in the present instance, namely, two near the centre (one marked 36a, 36b, and the other marked 37) and one near the outlet end marked 38. The disc portions of each twin disc are shown at 40 as having hub portions directed axially towards one another and having an axially-toothed engagement with one another.

It will be observed that, between adjacent discs, is a supporting spacing sleeve 42 which has a transitional fit on the shaft, preferably a slight interference fit. Each of these supporting sleeves 42 has at each end a ring of axially-extending teeth 43 which is engaged with a ring of correspondingly-shaped teeth 44 at the ends of the adjacent hubs of the discs.

Obviously, in assembly, the discs and sleeves at the largest diameter of the shaft, i. e., the disc 26 and adjacent sleeves 47 (Figure 1), will be the first to be assembled on the shaft, after which the remaining discs and sleeves can be successively assembled from opposite ends of the shaft.

To facilitate the withdrawal of a sleeve when dismantling is necessary, the drawings show the sleeves as being provided with screw-threads 49. In addition, in some cases the sleeves are internally grooved, as shown at 50, for lightening purposes.

For driving purposes one of the central sleeves 47 (marked 52a, 52b in Figure 3) is shown as being formed of two coaxial portions which are toothed at their adjacent ends to engage a row of driving dogs 54 (Figure 3) formed on the shaft.

What we claim as our invention and desire to secure by Letters Patent of the United States is:

1. A rotor comprising a shaft having cylindrical engaging surfaces, and a plurality of elements comprising discs and radially thin tubular spacing sleeves on said shaft, said discs spaced axially along said shaft and at least the majority of said discs having hubs which are radially clear of said shaft, said spacing sleeves arranged with a push fit on at least one of said cylindrical engaging surfaces to be between adjacent discs of said majority of discs, said sleeves having axially-extending teeth at their ends and close to the periphery of said shaft, said hubs at each axial end provided with axially-extending teeth engaging the teeth at the opposing end of the adjacent sleeve so that said discs will be supported by said toothed engagement, tooth means on at least one of said sleeves and tooth means on said shaft, both said tooth means interengaging for transmitting drive between said shaft and said discs.

2. A rotor comprising a shaft, a plurality of discs which are spaced axially along said shaft, at least the majority of said discs having hubs which are radially clear of said shaft, radially thin spacing sleeves between adjacent discs and having at least a push fit on said shaft, said sleeves having axially-extending teeth at their ends and close to the periphery of said shaft, said hubs at each axial end provided with axially-extending teeth engaging the teeth at the opposing end of the adjacent sleeve so that said discs will be supported by said toothed engagement, and means for transmitting the drive between said shaft and said discs, said means including a row of dogs formed on the outer periphery of said shaft, and one of said spacing sleeves formed of two sleeve portions having axially-extending dogs at the opposing sides engaged with said dogs on said shaft.

3. A rotor comprising a shaft having cylindrical engaging surfaces, a plurality of discs which are spaced axially along said shaft and surround said shaft, at least the majority of said discs each having a hub which is radially clear of the cylindrical engaging surface which it surrounds radially thin tubular spacing sleeves between adjacent discs of said majority of discs and having at least a push fit on at least one of said cylindrical engaging surfaces, said sleeves having axially-extending teeth at their ends and close to the periphery of said shaft, said hubs at each axial end provided with axially extending teeth engaging the teeth at the opposing end of the adjacent sleeve so that said discs will be supported by said toothed engagement, tooth means on at least one of said sleeves and tooth means on said shaft, both said tooth means interengaging for transmitting drive between said shaft and said discs.

References Cited in the file of this patent
UNITED STATES PATENTS

| | | |
|---|---|---|
| 1,593,393 | Doran | July 20, 1926 |
| 2,427,614 | Meier | Sept. 16, 1947 |
| 2,452,782 | McLeod et al. | Nov. 2, 1948 |
| 2,461,242 | Soderberg | Feb. 8, 1949 |
| 2,497,151 | Clark et al. | Feb. 14, 1950 |
| 2,548,886 | Howard | Apr. 17, 1951 |
| 2,618,463 | Lombard | Nov. 18, 1952 |
| 2,637,488 | Krouse | May 5, 1953 |
| 2,639,579 | Willgoos | May 26, 1953 |

FOREIGN PATENTS

| | | |
|---|---|---|
| 233,433 | Switzerland | Oct. 16, 1944 |